United States Patent
Cooley et al.

(10) Patent No.: US 7,827,311 B2
(45) Date of Patent: Nov. 2, 2010

(54) CLIENT SIDE PROTECTION AGAINST DRIVE-BY PHARMING VIA REFERRER CHECKING

(75) Inventors: Shaun Cooley, El Segundo, CA (US); Rowan Trollope, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 809 days.

(21) Appl. No.: 11/746,188

(22) Filed: May 9, 2007

(65) Prior Publication Data

US 2008/0281983 A1  Nov. 13, 2008

(51) Int. Cl.
G06F 15/16 (2006.01)
G06F 15/173 (2006.01)
G06F 11/00 (2006.01)

(52) U.S. Cl. .................... 709/245; 709/225; 726/2; 726/23

(58) Field of Classification Search ............ None
See application file for complete search history.

(56) References Cited

U.S. PATENT DOCUMENTS

| | | | |
|---|---|---|---|
| 2006/0075494 A1 | 4/2006 | Bertman et al. | |
| 2007/0074169 A1 | 3/2007 | Chess et al. | |
| 2007/0174630 A1* | 7/2007 | Shannon et al. | 713/183 |
| 2008/0060054 A1* | 3/2008 | Srivastava | 726/2 |
| 2009/0089426 A1* | 4/2009 | Yamasaki et al. | 709/225 |
| 2009/0292925 A1* | 11/2009 | Meisel | 713/176 |

FOREIGN PATENT DOCUMENTS

EP  1 681 825  7/2006

OTHER PUBLICATIONS

Ramzan, Z. (posting), "Drive-By Pharming: How Clicking on a Link Can Cost You Dearly", pp. 1-4 [online]. Retrieved from the Internet: <URL:http://www.symantec.com/enterprise/security_response/weblog/2007/02/driveby_pharming_how_clicking_1.html>., Mar. 5, 2007.

(Continued)

Primary Examiner—Wen-Tai Lin
(74) Attorney, Agent, or Firm—Gunnison, McKay & Hodgson, L.L.P.; Forrest Gunnison

(57) ABSTRACT

HTTP requests initiated from a web browser of a client computer system are proxied prior to release to a router, such as a home router. HTTP requests identifying a referrer URL corresponding to routable, public IP address and a target URL corresponding to a non-routable, private IP address are determined to be indicative of a drive-by pharming attack, and are blocked from sending to the router. HTTP requests not identifying a referrer URL corresponding to a routable, public IP address and a target URL corresponding to a non-routable, private IP address, the HTTP request are not determined to be indicative of a drive-by pharming attack, and are released for sending to the router. In some embodiments, an HTTP response received in response to a released HTTP request is proxied prior to release to the web browser. An HTTP response having content of type text/html or script is modified as indicated to prevent malicious activity and released to the web browser.

20 Claims, 8 Drawing Sheets

OTHER PUBLICATIONS

Stamm, S., Ramzan, Z., and Jakobsson, M., "*Drive-By Pharming*", pp. 1-15 [online]. Indiana University Technical TR641, Dec. 13, 2006. Retrieved from the Internet: <URL:http://www.symantec.com/avcenter/reference/Drivenby-Pharming.pdf>.

"*Symantec Warns Consumers to Protect Home Broadband Networks From New Attack*", pp. 1-2 [online]. Retrieved from the Internet:<URL: http://biz.yahoo.com/iw/070215/0215656.html>. No author provided, Mar. 5, 2007.

* cited by examiner

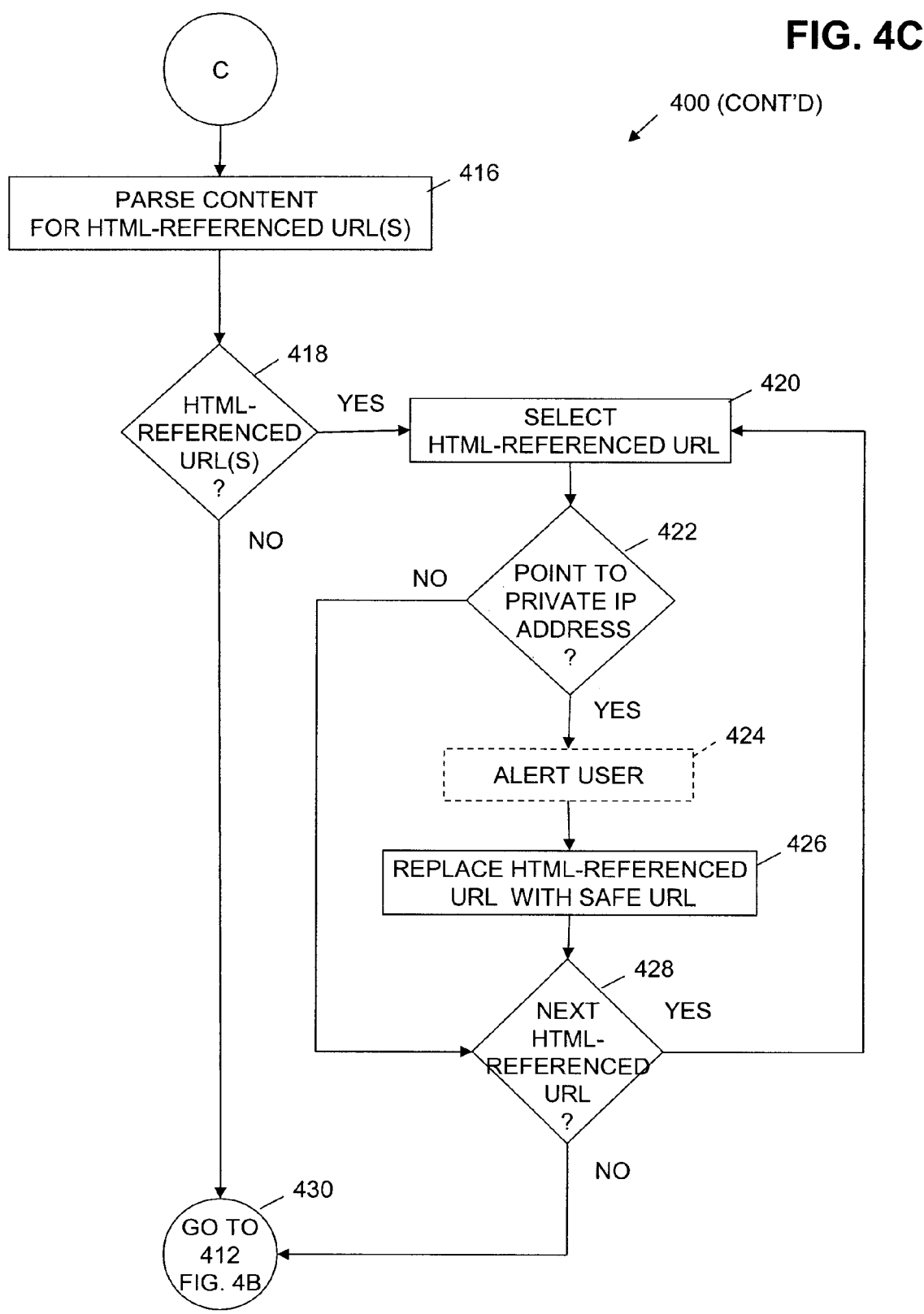

CLIENT SIDE PROTECTION AGAINST DRIVE-BY PHARMING VIA REFERRER CHECKING

BACKGROUND OF THE INVENTION

1. Field of the Invention

The present invention relates to computer systems. More particularly, the present invention relates to computer security.

2. Description of Related Art

Inexpensive broadband routers are a popular way for people to create an internal, and sometimes wireless, network in their homes. Unfortunately, by visiting a malicious web page, a person can inadvertently open up the router for a malicious attack. One type of malicious attack mountable against the client side router is termed a drive-by pharming attack, which can result in denial of service, infection with malicious code, or identity theft, as well as other malicious consequences.

SUMMARY OF THE INVENTION

In accordance with one embodiment of the invention, a method for protecting a client computer system from drive-by pharming attacks includes: proxying an HTTP request on a client computer system prior to release to a router, the HTTP request including an HTTP header; determining whether the HTTP header identifies a referrer URL corresponding to a routable, public IP address and a target URL corresponding to a non-routable, private IP address; upon a determination that the HTTP header identifies a referrer URL corresponding to a routable, public IP address and a target URL corresponding to a non-routable, private IP address, blocking the HTTP request; and providing an alert notification. Upon a determination that the HTTP header does not identify a referrer URL corresponding to a routable, public IP address and a target URL corresponding to a non-routable, private IP address, the HTTP request is released.

In accordance with another embodiment of the invention, the method further includes: proxying an HTTP response to a released HTTP request prior to release to the web browser, determining the content type of the HTTP response; determining whether the content type is type text/html or type script; wherein upon a determination that the content type is type text/html or type script; modifying the content to prevent malicious activity; and releasing the HTTP response. Upon a determination that the content type is not type text/html or type script, the HTTP response is released.

When the content type is type text/html, modifying the content to prevent malicious activity includes: parsing the HTML content for each HTML-referenced URL; determining whether each HTML-referenced URL corresponds to a non-routable, private IP address; wherein upon a determination that an HTML-referenced URL corresponds to a non-routable, private IP address, replacing the HTML-referenced URL with a safe URL; and releasing the HTTP response. In some embodiments, the user is alerted. Upon a determination that an HTML-referenced URL does not correspond to a non-routable, private IP address, the HTTP response is released.

When the content type is type script, modifying the content to prevent malicious activity includes: injecting a JavaScript override at the top of the content prior to any scripts, the JavaScript override defining a safe XMLHttpRequest and a safe ActiveX replacement object; parsing the content for scripts other than the JavaScript override; replacing each XMLHttpRequest in each script with the safe XMLHttpRequest; replacing each object tag in each script with the ActiveX replacement object; and releasing the HTTP response.

Embodiments described herein are best understood by reference to the following detailed description when read in conjunction with the accompanying drawings.

BRIEF DESCRIPTION OF THE DRAWINGS

FIGS. 4A-4D illustrate a flow diagram of a method for protecting a client computer system from drive-by pharming attacks in accordance with another embodiment of the invention.

Common reference numerals are used throughout the drawings and detailed description to indicate like elements.

DETAILED DESCRIPTION

Figure 1:
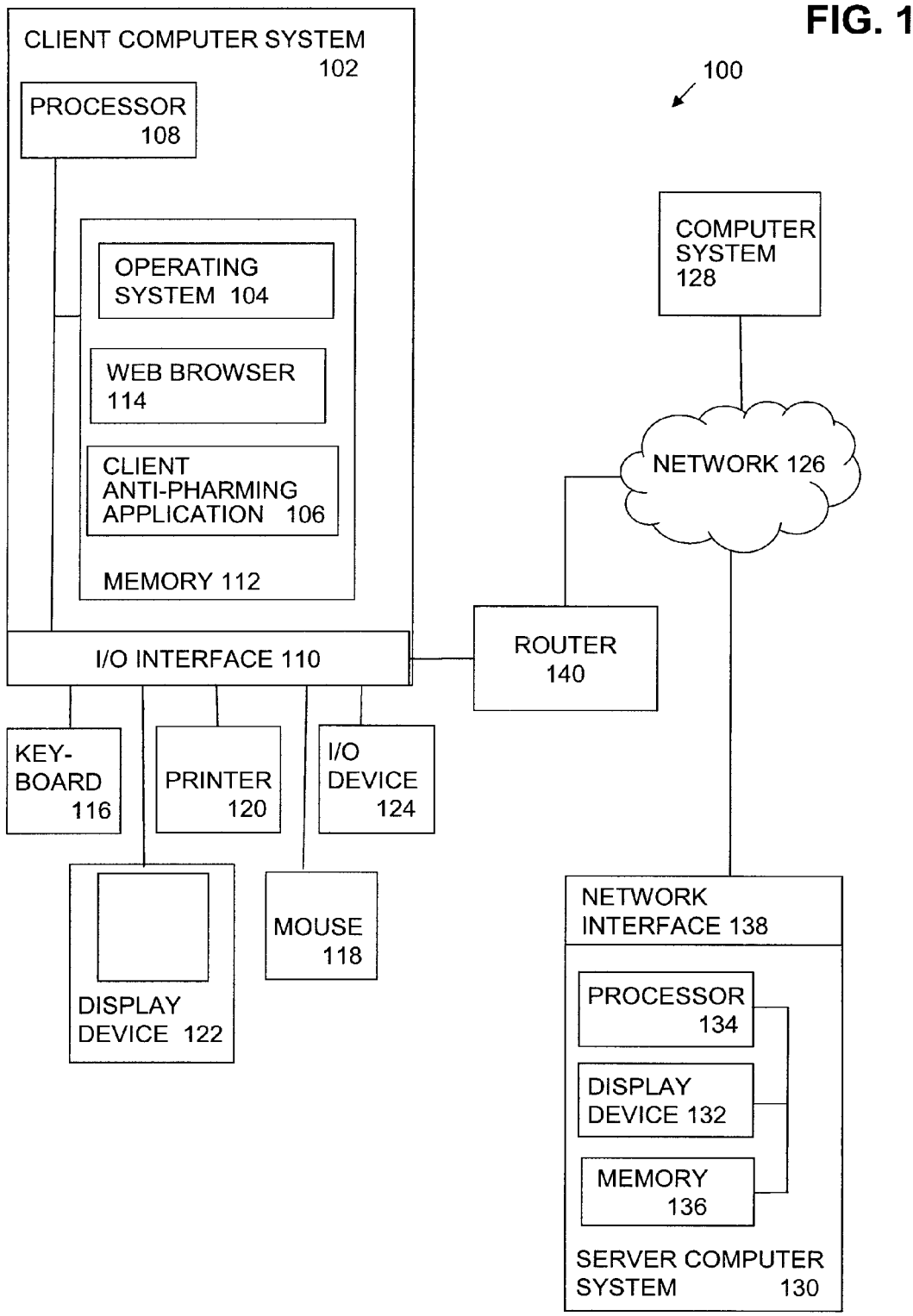
FIG. 1 is a diagram of a computer system that includes a client anti-pharming application executing on a client computer system in accordance with one embodiment of the invention.

In a typical home network utilizing a router, a user inputs a request for a resource, such as the URL of a web page, into a web browser on a client computer system of the home network. The web browser generates an HTTP request for the web page that is sent to the router which manages the DNS settings for the computer systems on the home network. Typically, the router performs a DNS lookup to locate the IP address associated with the URL of the requested web page and when completed, the HTTP request is sent to the associated server hosting the web page.

In a drive-by pharming attack, a web page including malicious code, such as drive-by pharming code, is returned as an HTTP response to the HTTP request. When the web page is run in the user's web browser, initially, the malicious code begins sending HTTP requests from the web browser to the router in an attempt to learn the IP address of the router. Once the router's IP address is obtained, the malicious code then connects to the web interface of the router and changes the settings so that DNS resolutions are redirected to a fraudulent web site.

Frequently the fraudulent web site mimics the appearance of the true web site so as not to alert the user of the redirection. This allows an attacker to capture information input to the fraudulent web site by the user, such as personal credentials and passwords. The attacker can then utilize the user's information to initiate malicious activity, such as obtaining false access to data or stealing money from the user's bank accounts. Further information on drive-by pharming can be found in the article "Drive-By Pharming" by Sid Stamm, Zulfikar Ramzan, and Markus Jakobsson, dated Dec. 13, 2006 (submitted as an NPL document along with the IDS filed Jun. 13, 2007).

In an HTTP request, the requested resource is conventionally identified by a Uniform Resource Locator (URL). A URL is a string of text that specifies the location of a resource accessible though HTTP. For example, with HTTP, a URL may be "http://abigbank.com".

A URL is typically resolved to a specific Internet Protocol (IP) address via a Domain Name Server (DNS) query, for example, by the web browser. Conventionally, an IP address is a 32-bit number. Thus, for example, the URL "http://abigbank.com" may be resolved to an IP address of "25.234.56.71".

An IP address is either a private IP address or a public IP address. As a URL corresponds to a particular IP address, herein a URL that corresponds to a private IP address is termed a private URL, and a URL that corresponds to a public IP address is herein termed a public URL.

Herein a private IP address is an IP address that is not routable, i.e., a private IP address cannot be used to connect directly to the Internet. Typically, IP addresses assigned to client computer systems on a home network served by a home router are non-routable, private IP addresses. For example, conventionally, IP addresses corresponding to the dot-decimal notation form, 10.x.x.x, 172.16.x.x, and 192.168.x.x, are private IP addresses and are non-routable.

Herein a public IP address is an IP address that is routable, i.e., a public IP address can be used to connect directly to the Internet. Typically, IP addresses assigned to web servers hosting web pages on the Internet are routable, public IP addresses. For example, conventionally, IP addresses that do not correspond to the dot-decimal notation form, 10.x.x.x, 172.16.x.x, and 192.168.x.x, are public IP addresses and are routable.

The format of an HTTP request for a resource, such as a web page, is specified by the HTTP protocol which requires an HTTP header that provides information about the HTTP request. The HTTP protocol defines numerous fields which can be utilized in an HTTP header. In particular, an HTTP request from an HTTP client typically includes a target URL field that includes data that identifies a requested URL, herein termed the target URL, and a "referrer" URL field that includes data that identifies the URL of the page containing the link the user followed to get to the current page from which the HTTP request is initiated, herein termed the referrer URL.

The format of an HTTP response to an HTTP request is also specified by the HTTP protocol which requires an HTTP header that provides information about the HTTP response. An HTTP response typically includes an HTTP message field, sometimes termed a content field, which contains the requested data or content, such as an HTML web page, scripts, files or program code. An HTTP response typically includes a content type field that includes data that identifies the media type, and sub-type when applicable, of the content being returned in the HTTP response, herein termed the content type. For example, a content type field may contain data that identifies the media type of the content as text/html or script.

Figure 2:
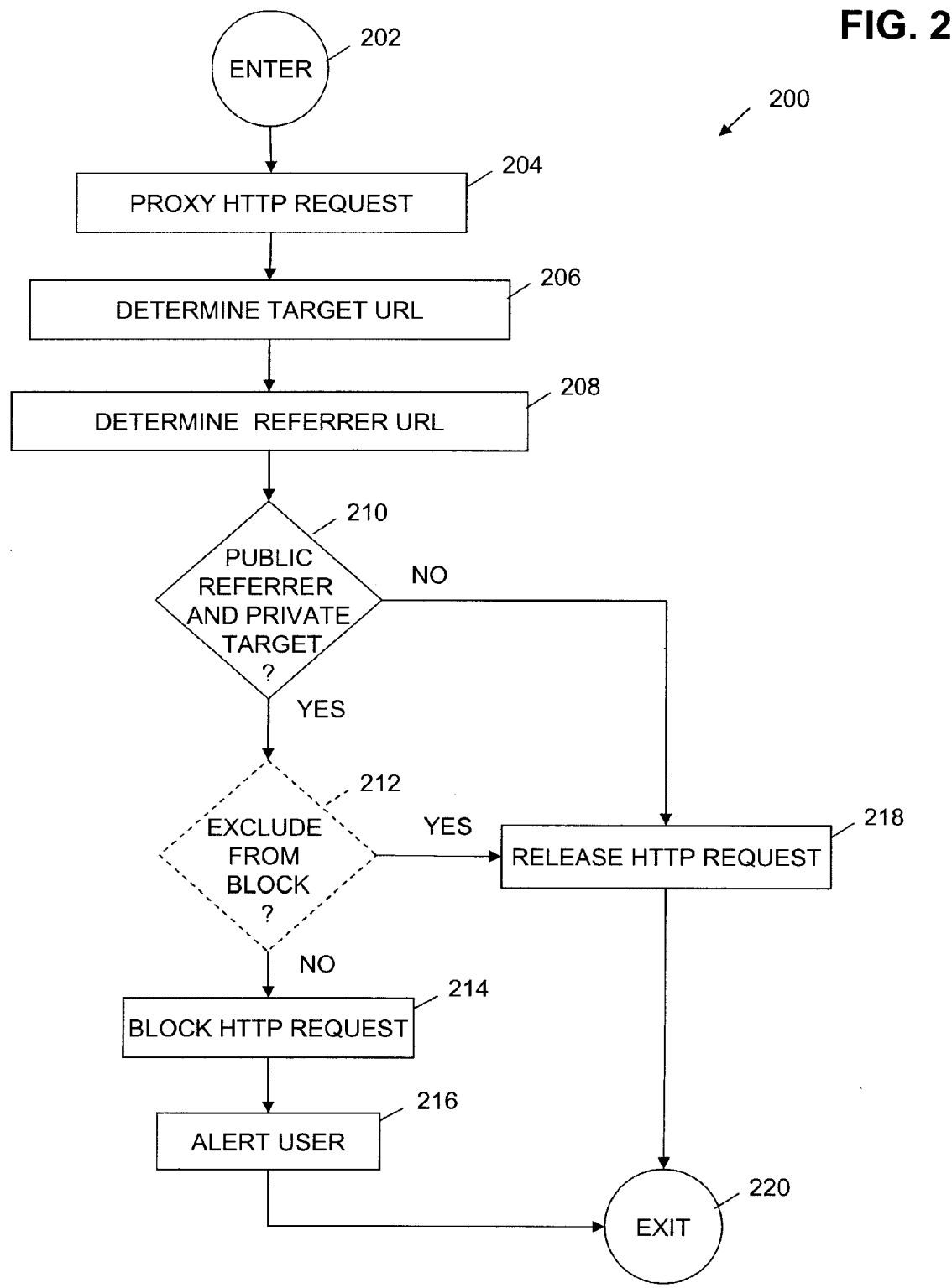
FIG. 2 illustrates a flow diagram of a method for protecting a client computer system from drive-by pharming attacks in accordance with one embodiment of the invention.

Referring now generally to FIG. 2, in one embodiment, an HTTP request generated on a client computer system, for example by a web browser, is proxied prior to release from the client computer system to a router, e.g., such as a client side home router (operation 204). The HTTP header present in the HTTP request is evaluated to determine the target URL (operation 206) and the referrer URL (operation 208).

A determination is made whether the HTTP header identifies both a referrer URL that corresponds to a routable, public IP address and a target URL that corresponds to a non-routable, private IP address (operation 210). When the HTTP header identifies both a referrer URL that corresponds to a public IP address and a target URL that corresponds to a private IP address, the HTTP request is determined to be indicative of a drive-by pharming attack. The HTTP request is blocked from sending to the router (operation 214), when not optionally excluded (operation 212), and a user alert is generated (operation 216).

Alternatively, when the HTTP header does not identify both a referrer URL that corresponds to a routable, public IP address and a target URL that corresponds to a non-routable, private IP address, the HTTP request is not determined to be indicative of a drive-by pharming attack, and the HTTP request is released for sending to the router (operation 218).

In another embodiment, the method of FIG. 2 is extended, so that an HTTP response to a released HTTP request is proxied and modified as indicated to protect the client computer system from drive-by pharming attacks which utilize embedded HTML object tags, script generated HTML object tags, and AJAX style XMLHttpRequest calls. Thus, referring generally to FIGS. 4A-4D, in one embodiment, additionally, an HTTP response to a released HTTP request is proxied prior to receipt by the web browser (operation 406) and the content type of the HTTP response is determined (operation 408). A determination is made whether the content type is identified as text/html or script (operation 410).

When the content type is not determined to be text/html or script ("NO"), the HTTP response is released for sending to the web browser (operation 412). Alternatively, when the content type is determined to be text/html, referring generally to FIG. 4C, the content is parsed for instances of HTML-referenced URLs (operation 416). Each HTML-referenced URL is evaluated to determine whether the URL points to a non-routable, private IP address (operations 420, 422). When an HTML-referenced URL points to a non-routable, private IP address, the original HTML-referenced URL is replaced with a safe URL, such as blank string or a safe replacement URL (operation 426). Optionally, a user alert is also generated (operation 424). The HTTP response is then released for sending to the web browser (operation 412).

Figure 4A:
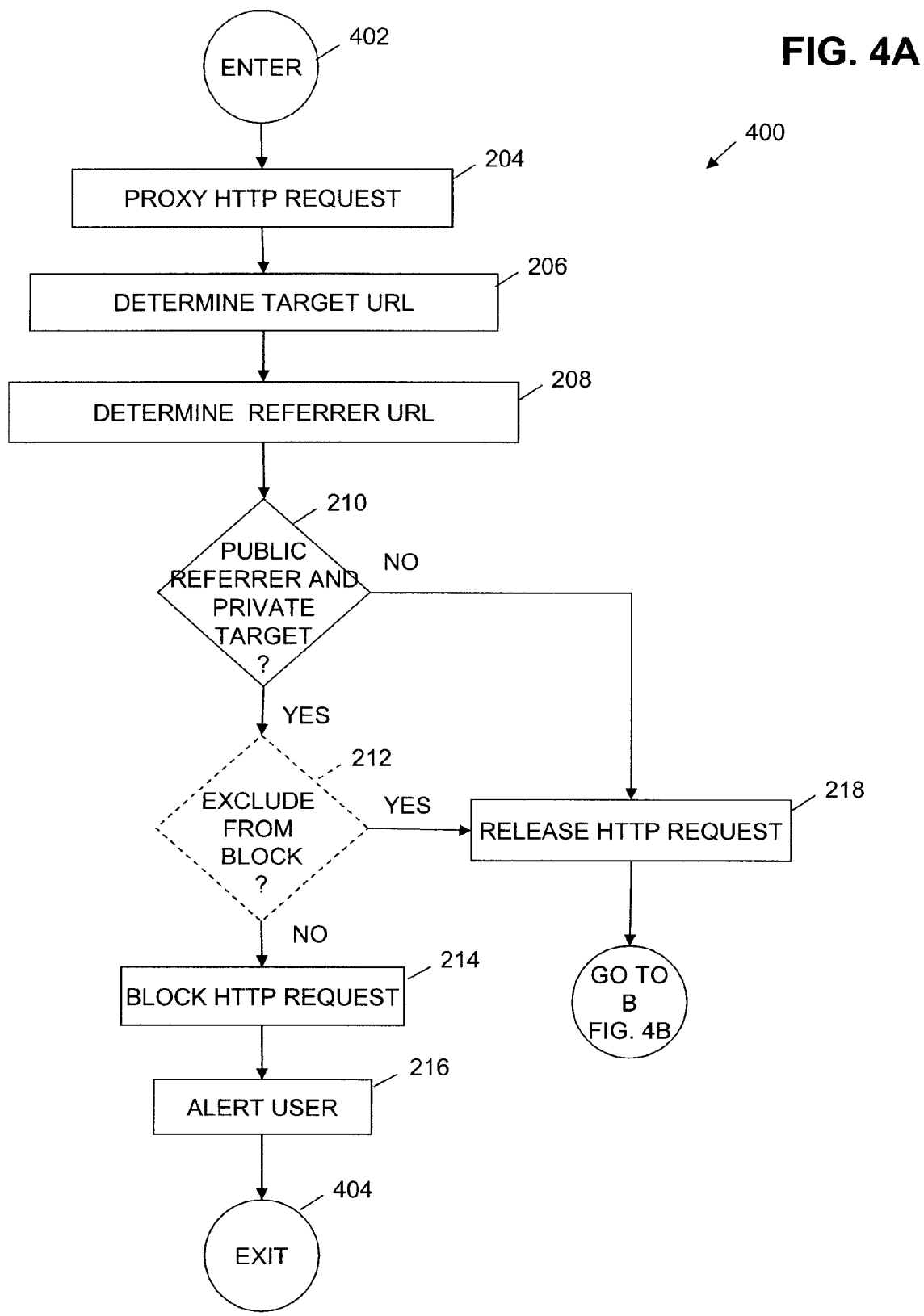
Figure 4B:
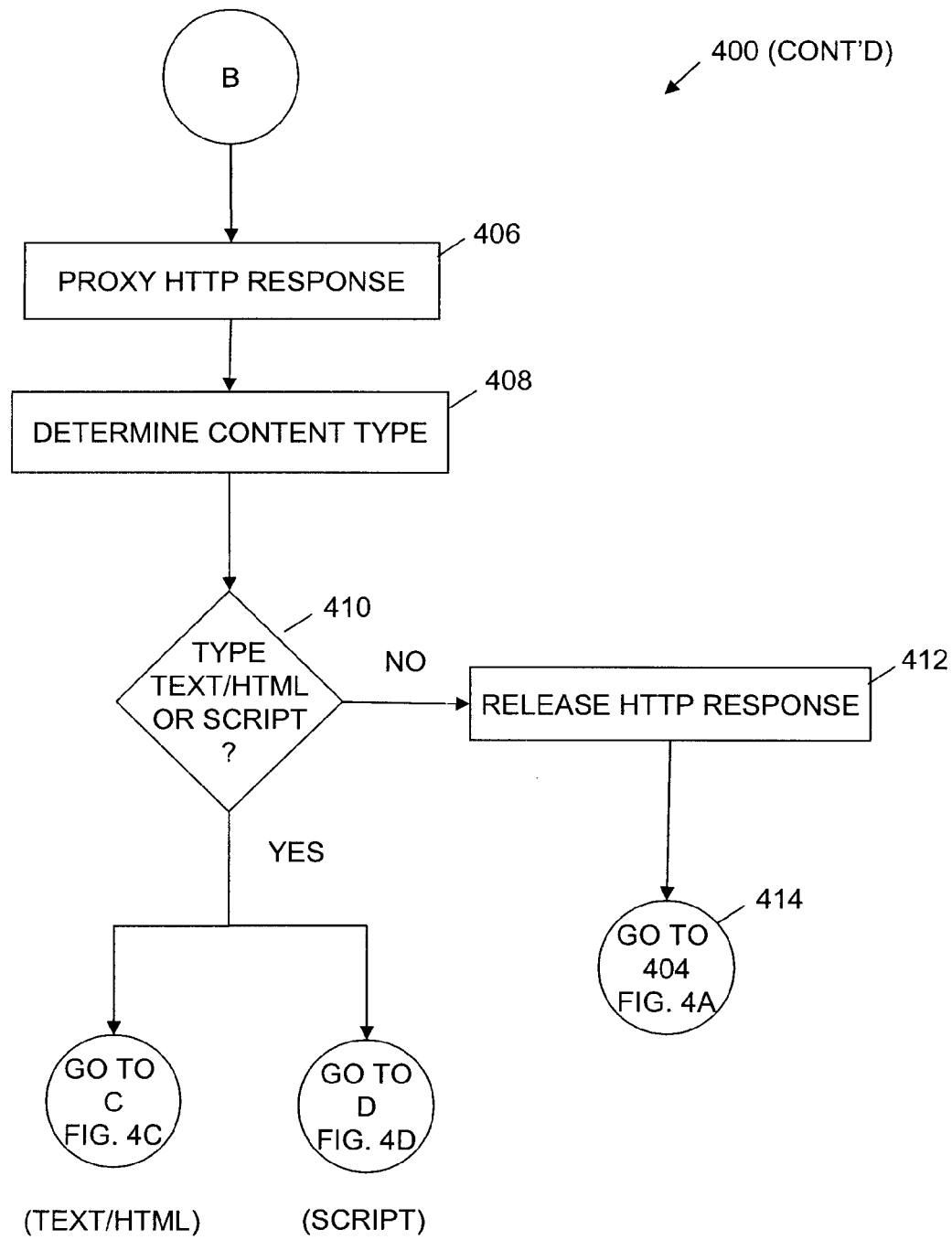
Figure 4D:
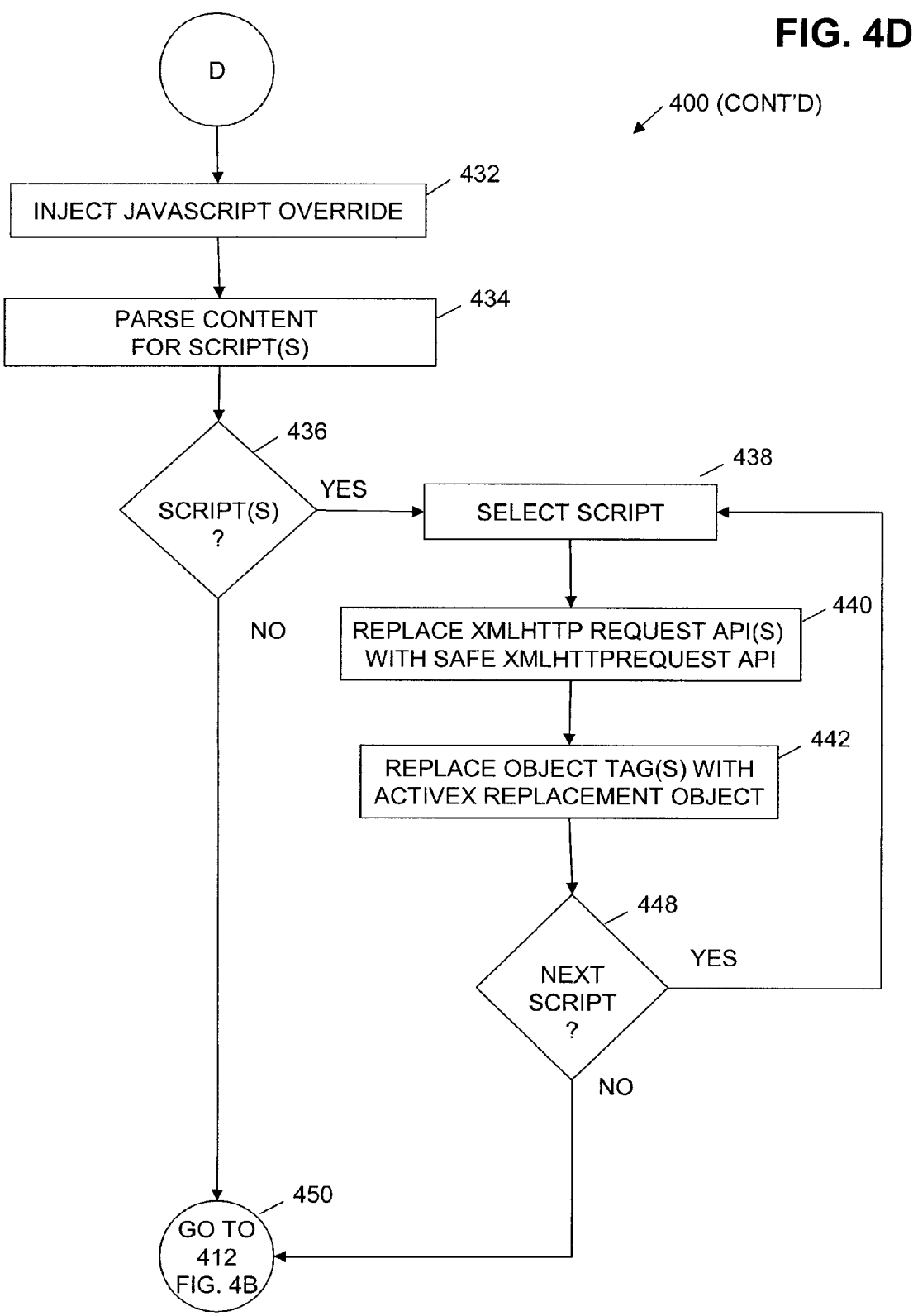

Alternatively, when the content type is determined to be script, referring generally to FIG. 4D, a JavaScript override is injected at the top of the content prior to any scripts (operation 432). In one embodiment, the JavaScript override defines a safe XMLHttpRequest and an ActiveX replacement object. The content is parsed for scripts, other than the injected JavaScript override (operation 434). Each instance of a direct use of an XMLHttpRequest in each script is replaced with the safe XMLHttpRequest (operation 440), and each object tag is replaced with the ActiveX replacement object (operation 442). The HTTP response is then released for sending to the web browser (operation 412).

More particularly, FIG. 1 is a diagram of a computer system 100 that includes a client anti-pharming application 106 executing on a client computer system 102, e.g., a first computer system, in accordance with one embodiment of the present invention. Client computer system 102, sometimes called a user device, typically includes a central processing unit (CPU) 108, hereinafter processor 108, an input output (I/O) interface 110, and a memory 112, including an operating system 104.

In one embodiment, memory 112 includes client anti-pharming application 106 and a web browser application 114. In one embodiment, web browser application 114 renders web page content. Web browser application 114 is any one of a number of conventional web browser applications, and the particular web browser application is not essential to this embodiment. Conventional web browsers are well known to those of skill in the art and are not further described herein to avoid detracting from the principles of the invention.

Client computer system 102 may further include standard devices like a keyboard 116, a mouse 118, a printer 120, and a display device 122, as well as, one or more standard input/output (I/O) devices 124, such as a compact disk (CD) or DVD drive, floppy disk drive, or other digital or waveform port for inputting data to and outputting data from client computer system 102. In one embodiment, client anti-pharming application 106 is loaded into client computer system 102 via I/O device 124, such as from a CD, DVD or floppy disk containing client anti-pharming application 106.

Client computer system 102 is coupled to a router 140, such as a home broadband router. Router 140 receives outbound HTTP requests initiated in web browser 114 and sent from client computer system 102. Router 140 sends the HTTP request to the indicated computer system, such as computer system 128.

Router 140 also receives inbound communications, such as an inbound HTTP response sent in return to an HTTP request. Router 140 sends the HTTP response to the identified computer system, such as client computer system 102. More particularly, router 140 sends the HTTP response to web browser 114 of client computer system 102. Router 140 is any one of a number of conventional routers, such as a home broadband router, and the particular router is not essential to this embodiment.

In the present embodiments, client anti-pharming application 106 proxies HTTP requests generated by web browser 114 prior to release from client computer system 102 to router 140. The HTTP requests are evaluated as further described herein for indications of malicious code activity, such as a drive-by pharming attack. HTTP requests determined to be indicative of a drive-by pharming attack are blocked from release from client computer system 102 to router 140, or other protective actions are taken prior to release to router 140.

In some embodiments, client anti-pharming application 106 also proxies HTTP responses prior to receipt by web browser 114, such as an HTTP response sent from computer system 128 in response to an HTTP request from web browser 114. The HTTP responses are evaluated and modified, when indicated, as further described herein to prevent malicious activity, such as a drive by pharming attack.

Router 140 is coupled to external computer systems by a network 126. For example, router 140 is coupled to a server computer system 130 and computer system 128 via network 126, e.g., the Internet. Server computer system 130 typically includes a display device 132, a processor 134, a memory 136, and a network interface 138.

In one embodiment, computer system 128 can be a web content server hosting a web page having malicious code that can affect a drive-by pharming attack when downloaded to a computer system. Herein, in one embodiment, malicious code is defined as any computer program, module, set of modules, or code that enters a computer system environment without an authorized user's knowledge and/or without an authorized user's consent. Code that can effect a drive-by pharming attack is one example of malicious code. Further herein, malicious activity is any activity resulting from the execution of malicious code.

In one embodiment, computer system 128 is similar to client computer system 102 and/or server computer system 130, for example, includes a central processing unit, an input output (I/O) interface, and a memory. Computer system 128 may further include standard devices like a keyboard, a mouse, a printer, a display device and an I/O device(s). The various hardware components of computer system 128 are not illustrated to avoid detracting from the principles of the invention.

Network 126 can be any network or network system that is of interest to a user. In various embodiments, network interface 138 and I/O interface 110 include analog modems, digital modems, or a network interface card. The particular type of and configuration of client computer system 102, computer system 128, and server computer system 130 are not essential to this embodiment of the present invention.

FIG. 2 illustrates a flow diagram of a method 200 for protecting a client computer system 102 from a drive-by pharming attack in accordance with one embodiment of the invention. In the present description it is assumed that a first HTTP request to a web site has issued from web browser 114 to computer system 128, and that a web page containing malicious drive-by pharming code was returned to web browser 114 and is now executing in web browser 114. More particularly, malicious drive-by pharming code present in a web page executing in web browser 114 is initiating HTTP requests, for example, in an attempt to effect a drive-by pharming attack on client computer system 102.

Referring now to FIGS. 1 and 2 together, in one embodiment, execution of client anti-pharming application 106 by processor 108 results in the operations of method 200 as described below. Method 200 is entered at an ENTER operation 202 with processing transitioning to a PROXY HTTP REQUEST operation 204.

In PROXY HTTP REQUEST operation 204, an outbound HTTP request originating on client computer system 102, such as from malicious code executing in web browser 114, is proxied prior to release from client computer system 102 to router 140. In one embodiment, the HTTP request is proxied by an HTTP proxy component of client anti-pharming application 106. The HTTP request can be proxied utilizing any of a variety of proxy techniques, such as by hooking techniques, such that the HTTP request is stalled from sending to router 140. Proxying of HTTP requests is well known to those of skill in the art and is not further described herein to avoid detracting from the principles of the invention.

In one embodiment, the HTTP request includes an HTTP header having at least a referrer URL and a target URL. As earlier described, the referrer URL corresponds to, i.e., resolves to, an IP address of the web page the user accessed from which the target URL is being requested. The target URL corresponds to, i.e., resolves to, an IP address of the requested web page, herein referred to as the target URL IP address. From PROXY HTTP REQUEST operation 204, processing transitions to a DETERMINE TARGET URL operation 206.

In DETERMINE TARGET URL operation 206, the target URL is determined from the HTTP header of the HTTP request proxied in operation 204, for example, by parsing the HTTP header or by using other evaluative techniques to determine the target URL. From DETERMINE TARGET URL operation 206, processing transitions to a DETERMINE REFERRER URL operation 208.

In DETERMINE REFERRER URL operation 208, the referrer URL is determined from the HTTP header of the HTTP request proxied in operation 204, for example, by parsing the HTTP header or by using other evaluative techniques to determine the referrer URL. From DETERMINE REFERRER URL operation 208, processing transitions to a PUBLIC REFERRER AND PRIVATE TARGET check operation 210.

In PUBLIC REFERRER AND PRIVATE TARGET check operation 210, the target URL determined in operation 206 and the referrer URL determined in operation 208 are each resolved, or otherwise corresponded, to respective IP addresses. For example, the target URL is resolved, or otherwise corresponded, to a target URL IP address, and the referrer URL is resolved, or otherwise corresponded, to a referrer URL IP address.

A determination is made whether the referrer URL IP address is a routable, public IP address and the target URL IP address is a non-routable, private IP address. In one embodiment, the referrer URL IP address and the target URL IP address are compared to a database of known private and/or public IP addresses, or are otherwise evaluated to determine whether each respective URL IP address is a public or a private IP address.

In one embodiment, the combination of a referrer URL IP address that is determined to be a routable, public IP address together with a target URL IP address that is determined to be a non-routable, private IP address is viewed as indicative of a drive-by pharming attack. For example, the above combination can indicate an to attempt by malicious code executing in web browser 114 to identify the IP address of router 140 so that malicious changes can be implemented on router 140 to enable a drive-by pharming attack.

Alternatively, combinations in which the referrer URL IP address is a public IP address and the target URL IP address is a public IP address, or in which the referrer URL IP address is a private IP address and the target URL IP address is either a public or private IP address, are not viewed as indicative of a drive-by pharming attack. Thus, in one embodiment, when it is not determined that the referrer URL IP address is a routable, public IP address and the target URL IP address is a non-routable, private IP address ("NO"), a drive-by pharming attack is not indicated, and processing transitions from PUBLIC REFERRER AND PRIVATE TARGET check operation 210 to a RELEASE HTTP REQUEST operation 218.

In RELEASE HTTP REQUEST operation 218, the HTTP request proxied in operation 204 is released and allowed to proceed from client computer system 102 to router 140. From RELEASE HTTP REQUEST operation 218 processing exits method 200 at an EXIT operation 220, or optionally returns to operation 204 on proxying of a next HTTP request.

Referring back again to PUBLIC REFERRER AND PRIVATE TARGET check operation 210, alternatively, when it is determined that the referrer URL IP address is a routable, public IP address and the target URL IP address is a non-routable, private IP address ("YES"), this combination is indicative of a drive-by pharming attack. From PUBLIC REFERRER AND PRIVATE TARGET check operation 210, processing optionally transitions to an EXCLUDE FROM BLOCK check operation 212, or transitions directly to a BLOCK HTTP REQUEST operation 214.

In optional EXCLUDE FROM BLOCK check operation 212, a determination is made whether to exclude the HTTP request from being blocked. For example, in one embodiment, the referrer URL IP address is compared to entries in an excluded referrer URL IP address list and/or the target URL IP address is compared to entries in an excluded target URL IP address list.

In one embodiment, a match of the referrer URL IP address to an entry in the excluded referrer URL IP address list and/or a match of the target URL IP address to an entry in the excluded target URL IP address list results in a determination to exclude the HTTP request from being blocked. In other embodiments, other exclusionary evaluation techniques utilizing the referrer URL IP address and/or the target URL IP address can be utilized. In still other embodiments, other parameters of the HTTP request can be evaluated to make the determination whether to exclude the HTTP request from being blocked.

In one embodiment, upon a determination to exclude the HTTP request from being blocked ("YES"), processing transitions from optional EXCLUDE FROM BLOCK check operation 212 to RELEASE HTTP REQUEST operation 218, earlier described. Alternatively, upon a determination not to exclude the HTTP request from being blocked ("NO"), from EXCLUDE FROM BLOCK check operation 212, processing transitions to BLOCK HTTP REQUEST operation 214.

In BLOCK HTTP REQUEST operation 214, the HTTP REQUEST is blocked. In one embodiment, the HTTP request is prevented from sending to router 140. In this way, the malicious code is prevented from learning the IP address of the router via an HTTP request, and is prevented from initiating malicious changes to router 140, such as those malicious changes used to support a drive-by pharming attack. From BLOCK HTTP REQUEST operation 214, processing transitions to an ALERT USER operation 216.

In ALERT USER operation 216, an alert notification is generated and provided to a user. The user is notified using any one of a number of techniques, for example, by generating and displaying a pop up window on display device 122. In one embodiment, the user of client computer system 102 is alerted that malicious code, such as drive-by pharming code, is present on client computer system 102 and/or that the HTTP request is blocked. From ALERT USER operation 216, processing exits method 200 at EXIT operation 220, or optionally returns to operation 204 on proxying of a next outbound HTTP request on client computer system 102.

In the above embodiment, the blocking of the HTTP request, e.g., operation 214, is automatically performed without the need for user input. In an alternate embodiment, the user is queried to confirm or deny the blocking of the HTTP request prior to the blocking of the HTTP request as further described herein with reference to FIGS. 3A and 3B.

Figure 3A:
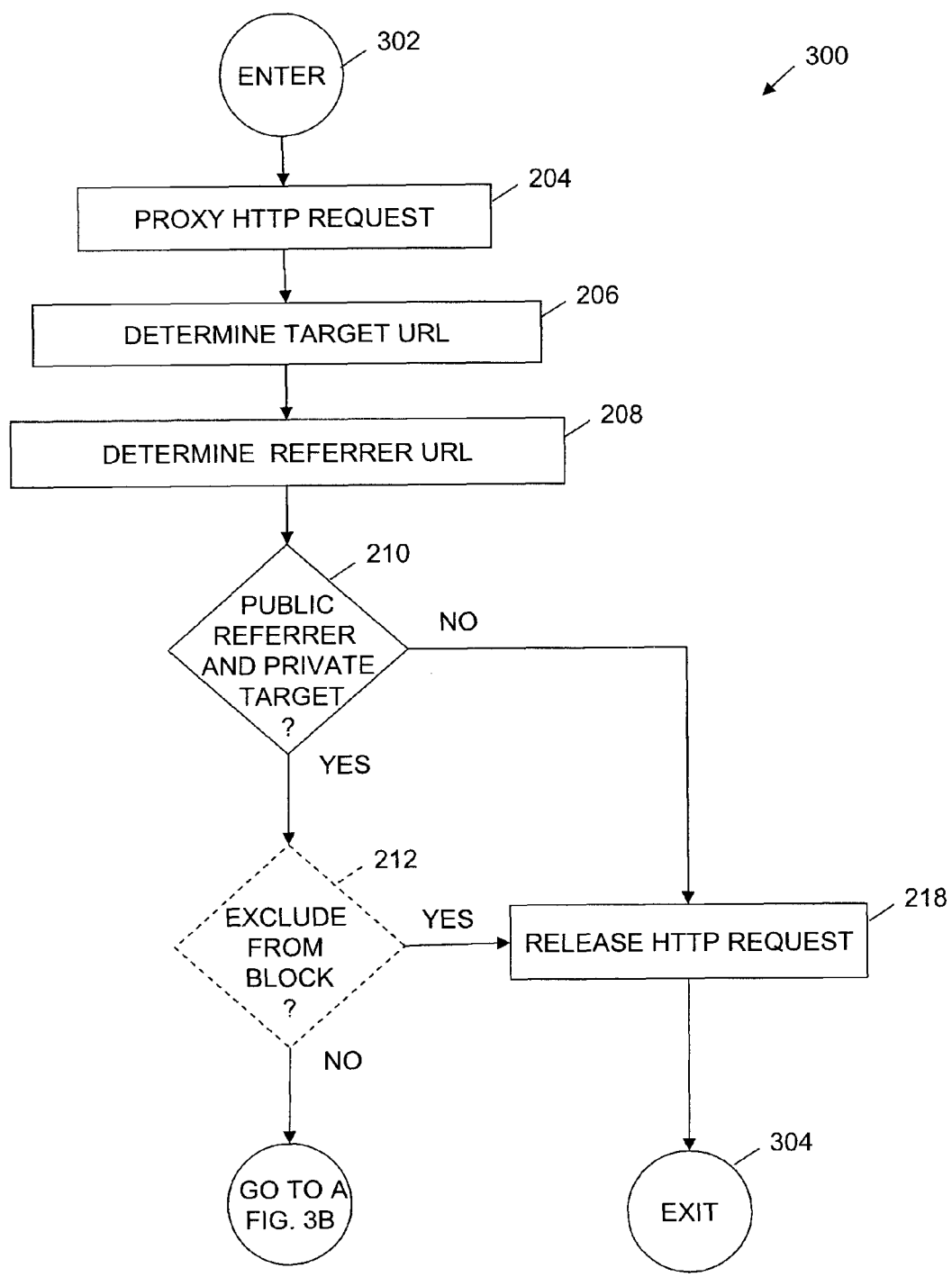
FIGS. 3A and 3B illustrate a flow diagram of a method for protecting a client computer system from drive-by pharming attacks with user prompting in accordance with another embodiment of the invention.
Figure 3B:
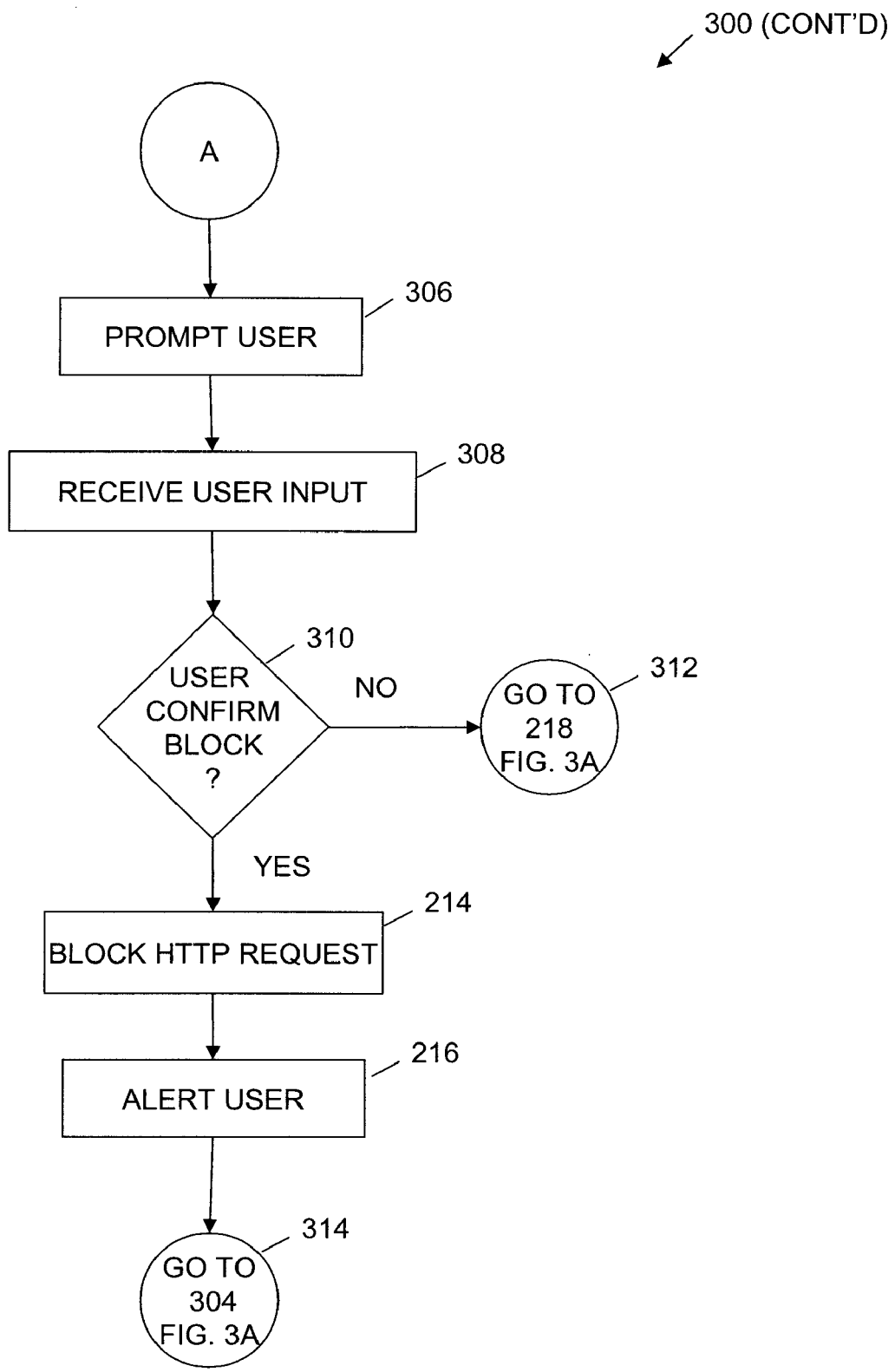

FIGS. 3A and 3B illustrate a flow diagram of a method 300 for protecting a client computer system 102 from a drive-by pharming attack in accordance with another embodiment of the invention. Referring now to FIGS. 1, 2, 3A and 3B together, in one embodiment, execution of client anti-pharming application 106 by processor 108 results in the operations of method 300 as described below. Referring to FIG. 3A, in one embodiment, method 300 is entered at an ENTER operation 302 and processing transitions to PROXY HTTP REQUEST operation 204.

PROXY HTTP REQUEST operation 204 is performed with processing continuing through operations 206, 208, check operation 210, and check operation 212 (optional) as earlier described above, except that from EXCLUDE FROM BLOCK check operation 212 ("NO"), or directly from PUBLIC REFERRER AND PRIVATE TARGET check operation 210 ("YES") when check operation 212 is not performed, processing transitions to a PROMPT USER operation 306 (FIG. 3B).

Referring to FIG. 3B, in PROMPT USER operation 306, a user prompt is generated and displayed on client computer system 102 requesting user input whether to confirm or deny the blocking action. For example, in one embodiment, a pop up or other notification is generated and displayed on display device 122 prompting a user (not shown) for input whether to block the HTTP request.

In some embodiments, the user prompt provides a text explanation, such as an explanation that the HTTP request is suspicious and/or indicative of a drive-by pharming attack. In one embodiment, the user prompt is a graphical user interface that allows a user to input a response selection that results in the blocking or release of the HTTP request when received by client anti-pharming application 106.

For example, the graphical user interface can include a text query, such as "An HTTP request that is indicative of a drive-by pharming attack has been generated. Do you want to block the request?"; and, can further include two response selection buttons, such as "YES" and "NO". In one example, selection of the "YES" button results in an affirmative response being sent to client anti-pharming application 106, and selection of the "NO" button results in a negative response being sent to client anti-pharming application 106. From PROMPT USER operation 306, processing transitions to a RECEIVE USER INPUT operation 308.

In RECEIVE USER INPUT operation 308, the user's input is received by client anti-pharming application 106. For example, a user's input to the graphical user interface generated and displayed in operation 306 to confirm or deny the blocking of the HTTP request is received. From RECEIVE USER INPUT operation 308, processing transitions to a USER CONFIRM BLOCK check operation 310.

In USER CONFIRM BLOCK check operation 310, a determination is made whether the user input received in operation 308 confirms the blocking of the HTTP request. Continuing the earlier example, an affirmative response ("YES") confirms the blocking of the HTTP request, and a negative response ("NO") denies blocking of the HTTP request.

When the user does not confirm, i.e., denies, the block of the HTTP request ("NO"), the HTTP request is to be released and processing transitions from USER CONFIRM BLOCK check operation 310, to RELEASE HTTP REQUEST operation 218, performed as earlier described. From RELEASE HTTP REQUEST operation 218, processing transitions to an EXIT operation 304 with processing exiting method 300 or optionally returning to operation 204 (FIG. 3A) on proxying of a next outbound HTTP request.

Referring again to USER CONFIRM BLOCK check operation 310, alternatively, when the user confirms the block of the HTTP request ("YES"), the HTTP request is to be blocked, and processing transitions from USER CONFIRM BLOCK check operation 310 to BLOCK HTTP REQUEST operation 214, performed as earlier described. From BLOCK HTTP REQUEST operation 218, processing transitions to ALERT USER operation 216, performed as earlier described. From ALERT USER operation 218 processing transitions to EXIT operation 304 with processing exiting method 300, or optionally returning to operation 204 (FIG. 3A) on proxying of a next outbound HTTP request.

In another embodiment, described herein with reference to FIGS. 4A-4D, method 200 is extended so that an HTTP response returned in response to an HTTP request is evaluated and modified, as indicated, to further protect client computer system 102 from drive-by pharming attacks. More particularly, an inbound HTTP response is proxied prior to receipt by web browser 114 and evaluated and modified, where indicated, to protect client computer system 102 from malicious code present in the content of the HTTP response.

FIGS. 4A-4D illustrates a flow diagram of a method 400 for protecting a client computer system from a drive-by pharming attack in accordance with another embodiment of the invention. Referring now to FIGS. 1, 2, and 4A-4D together, in one embodiment, execution of client anti-pharming application 106 by processor 108 results in the operations of method 400 as described below.

In one embodiment, method 400 is entered at an ENTER operation 402 and processing transitions to PROXY HTTP REQUEST operation 204. PROXY HTTP REQUEST operation 204 with processing continuing through operations 206, 208, check operation 210, check operation 212, operations 214, 216 and 218, as earlier described above with reference to method 200 and FIG. 2 reference, except that following RELEASE HTTP REQUEST operation 218, processing transitions to a PROXY HTTP RESPONSE operation 406 (FIG. 4E) on proxying of an HTTP response returned in response to the HTTP request released in operation 218

Referring to FIG. 4B, in PROXY HTTP RESPONSE operation 406, an inbound HTTP response received on client computer system 102, such as from computer system 128, is proxied prior to sending to web browser 114. For example, in one embodiment, the inbound HTTP response is stalled by an HTTP proxy component of client anti-pharming application 106. The HTTP response can be stalled utilizing any of a variety of proxy techniques, such as by hooking techniques. Proxying of HTTP responses is well known to those of skill in the art and is not further described herein to avoid detracting from the principles of the invention.

In one embodiment, the HTTP response includes an HTTP header having at least a content type field(s), and may further include content, such as malicious drive-by pharming code. From PROXY HTTP RESPONSE operation 406, processing transitions to a DETERMINE CONTENT TYPE operation 408.

In DETERMINE CONTENT TYPE operation 408, the HTTP response is evaluated to determine the content type of the content being returned in the HTTP response, if any. In one embodiment, the content type field(s) of the HTTP response is evaluated to determine the content type and any subtype, when applicable, for example, by parsing or scanning or otherwise evaluating the HTTP response. From DETERMINE CONTENT TYPE operation 408, processing transitions to a TYPE TEXT/HTML OR SCRIPT check operation 410.

In TYPE TEXT/HTML OR SCRIPT check operation 410, a determination is made whether the content type determined in operation 408 is identified as either text/html or script. When the content type is not text/html or script ("NO"), from TYPE TEXT/HTML OR SCRIPT check operation 410, processing transitions to RELEASE HTTP RESPONSE operation 412.

In RELEASE HTTP RESPONSE operation 412, the HTTP response proxied in operation 406 is released and allowed to proceed to web browser 114. From RELEASE HTTP RESPONSE operation 412, processing exits method 400 at an EXIT operation 404, or optionally returns to operation 204 (FIG. 4A) on proxying of a next HTTP request.

Referring again to TYPE TEXT/HTML OR SCRIPT check operation 410 (FIG. 4B), alternatively, when the content type is text/html or script ("YES"), from TYPE TEXT/HTML OR SCRIPT check operation 410, processing transitions to a PARSE CONTENT FOR HTML-REFERENCED URL(S) operation 416 (FIG. 4C), when the type is text/html, or to an INJECT JAVASCRIPT OVERRIDE operation 432 (FIG. 4D), when the type is script.

Referring now to FIG. 4C, when the content type of the HTTP response is determined to be type text/html, in PARSE CONTENT FOR HTML-REFERENCED URL(S) operation 416, the HTML content of the HTTP response is parsed to locate each HTML-referenced URL. In one embodiment, a light-weight HTML parser component of client anti-pharming application 106 can be used to parse the HTML content and locate each HTML-referenced URL. In one embodiment, examples of HTML-referenced URLs include A, IMG, SCRIPT, STYLE, OBJECT, and EMBED tags, as well as URLs referenced from inline or block styles. From PARSE CONTENT FOR HTML-REFERENCED URL(S) operation 416, processing transitions to an HTML-REFERENCED URL(S) check operation 418.

In HTML-REFERENCED URL(S) check operation 418, a determination is made whether at least one HTML-referenced URL is identified in operation 416. When no HTML-referenced URLs are identified in operation 416 ("NO"), from HTML-REFERENCED URL(S) check operation 418, processing transitions, at operation 430, to RELEASE HTTP RESPONSE operation 412 (FIG. 4B) with release of the HTTP response to web browser 114 earlier described.

Referring back again to FIG. 4C, alternatively, when at least one HTML-referenced URL is identified in operation 416 ("YES"), from HTML-REFERENCED URL(S) check operation 418, processing transitions to a SELECT HTML-REFERENCED URL operation 420.

In SELECT HTML-REFERENCED URL operation 420, a first HTML-referenced URL identified in operation 416 is selected for evaluation. From SELECT HTML-REFERENCED URL operation 420, processing transitions to a POINT TO PRIVATE IP ADDRESS check operation 422.

In POINT TO PRIVATE IP ADDRESS check operation 422, a determination is made whether the HTML-referenced URL selected in operation 420 corresponds to a private IP address. In one embodiment, the HTML-referenced URL is resolved, or otherwise corresponded, to an IP address, herein termed the HTML-referenced URL IP address.

In one embodiment, the HTML-referenced URL IP address is compared to a database of known private and/or public IP addresses, or is otherwise evaluated to determine whether the HTML-referenced URL IP address is a private IP address. When the HTML-referenced URL IP address is not a private IP address, i.e., is a public IP address ("NO"), from POINT TO PRIVATE URL IP ADDRESS check operation 422, processing transitions to a NEXT HTML-REFERENCED URL check operation 428.

In NEXT HTML-REFERENCED URL check operation 428, a determination is made whether a next HTML-referenced URL identified in operation 416 remains to be evaluated. When a next HTML-referenced URL remains to be evaluated ("YES"), from NEXT HTML-REFERENCED URL check operation 428 processing returns to operation 420 with a next HTML-referenced URL being selected for evaluation. Alternatively, when a next HTML-referenced URL does not remain to be evaluated ("NO"), from NEXT HTML-REFERENCED URL check operation 428, at operation 430, processing transitions to operation 412 (FIG. 4B) with the HTTP response released for sending to web browser 114, and processing exiting method 400 at EXIT operation 404, or optionally returning to operation 204 (FIG. 4A) on proxying of a next HTTP request.

Referring again to FIG. 4C and POINT TO PRIVATE IP ADDRESS check operation 422, alternatively, when the HTML-referenced URL IP address is a private IP address ("YES"), from POINT TO PRIVATE URL IP ADDRESS check operation 422, processing optionally transitions to an ALERT USER operation 424, or transitions directly to a REPLACE HTML-REFERENCED URL WITH SAFE URL operation 426.

In optional ALERT USER operation 424, an alert notification is generated and provided to a user. The user is notified using any one of a number of techniques, for example, by generating and displaying a pop up window on display device 122. In one embodiment, the user of client computer system 102 (FIG. 1) is alerted that malicious code, such as drive-by pharming code is detected and that HTML-referenced URLs in the HTTP response will be replaced with a safe HTML URL, or removed. From optional ALERT USER operation 424, processing transitions to a REPLACE HTML-REFERENCED URL WITH SAFE URL operation 426.

In REPLACE HTML-REFERENCED URL WITH SAFE URL operation 426, the original HTML-referenced URL is replaced with a safe URL, such as a blank string, or a dummy URL, for example, that points to a dummy file. In some embodiments, the original HTML-referenced URL is removed, for example such that <A HREF="http://192.168.1.1"> becomes <A HREF=" ">, or the original HTML-referenced URL is specially handled so that a zero byte response is returned. From REPLACE HTML-REFERENCED URL WITH SAFE URL operation 426, processing transitions to NEXT HTML-REFERENCED URL check operation 428 earlier described with processing returning to operation 420 ("YES") or transitioning to RELEASE HTTP RESPONSE operation 412 (FIG. 4B) ("NO")") earlier described. From RELEASE HTTP RESPONSE operation 412 (FIG. 4B), the HTTP response is released for sending to web browser 114.

Referring again to FIG. 4B and TYPE TEXT/HTML OR SCRIPT check operation 410, alternatively, when the content type of the HTTP response is determined to be script, processing transitions from TYPE TEXT/HTML check operation 410, to INJECT JAVASCRIPT OVERRIDE operation 432 (FIG. 4D). Referring now to FIG. 4D, in INJECT JAVASCRIPT OVERRIDE operation 432, JavaScript that overrides selected proper functionality(ies) in the content to prevent scripted attacks, herein termed a JavaScript override, is injected in the content of the HTML request. In one embodiment, the JavaScript override is injected at the top of the HTML page content prior to all <script> tags.

In one embodiment, the JavaScript override defines a safe application program interface (API) class, e.g., a safe XMLHttpRequest API, for example, called SafeXMLHttpRequest, which contains all the functionality of a standard XMLHttpRequest API, but also determines the referrer IP address and target IP address before issuing an HTTP request. The JavaScript override then implements an execute "document.write=SafeWrite".

The "document.write=SafeWrite" ensures that all calls to document.write( )do not attempt to inject new HTML that references a private IP address or new JavaScript that attempts to use the standard XMLHttpRequest. When document.write( )is called with HTML referencing a private IP address, the same removal/replacement, as earlier described with reference to operation 426 (FIG. 4C) and herein incorporated by reference, occurs.

When document.write( ) is called with JavaScript that tries to make use of the standard XMLHttpRequest API, the JavaScript is replaced with the SafeXMLHttpRequest API, or the randomized equivalent name. In one embodiment, the variable and class names used in the JavaScript override are randomized to reduce circumvention of the JavaScript override should an attacker become aware of the variable and class names used in the injected JavaScript override.

In one embodiment, the JavaScript override also defines an ActiveX replacement object. When the ActiveX replacement object is called, the ActiveX replacement object proxies the request to the original ActiveX object, first checking whether the request identifies a referrer IP address that is public and a target IP address that is private, and taking the appropriate block/prompt action as earlier described with reference to methods 200 and 300. This provides protection for older versions of some web browsers, such as Internet Explorer, that do not support the XMLHttpRequest API, and protection against web sites that attempt to use older ActiveX objects to attack a computer system.

The ActiveX replacement object does not need to take over the registration for the true ActiveX object as the method of replacing XMLHttpRequest API with the safe XMLHttpRequest API earlier described with reference to operation 426 (FIG. 4C) can also be used to replace Microsoft.XMLHTTP, for example with a safe object, such as Symantec.SafeXMLHTTP, e.g., search and replace in existing JavaScript and searching document.write( ) calls for generated script. From INJECT JAVA SCRIPT OVERRIDE operation 432, processing transitions to a PARSE CONTENT FOR SCRIPT(S) operation 434.

In PARSE CONTENT FOR SCRIPT(S) operation 434, the content of the HTTP response is parsed to locate each script, other than the JavaScript override injected in operation 432. In one embodiment, the data present in the content field of the HTTP response is parsed to identify each script. From PARSE CONTENT FOR SCRIPT(S) operation 434, processing transitions to a SCRIPT(S) check operation 436.

In SCRIPT(S) check operation 436, a determination is made whether at least one script is identified in operation 434. When no scripts are identified in operation 434 ("NO"), from SCRIPT(S) check operation 436, processing transitions, at operation 450, to RELEASE HTTP RESPONSE operation 412 (FIG. 4B) earlier described with release of the HTTP response to web browser 114. Alternatively, when at least one script is identified in operation 434 ("YES"), from SCRIPT (S) check operation 434, processing transitions to a SELECT SCRIPT operation 438.

In SELECT SCRIPT operation 438, a script identified in operation 434 is selected for evaluation. From SELECT SCRIPT operation 438, processing transitions to a REPLACE XMLHTTPREQUEST API(S) WITH SAFE XMLHTTPREQUEST API operation 440.

In REPLACE XMLHTTPREQUEST API(S) WITH SAFE XMLHTTPREQUEST API operation 440, each XMLHttpRequest API present in the script, if any, is replaced with the safe XMLHttpRequest API, e.g., SafeXMLHttpRequest API, or other safe equivalent, earlier injected and defined at operation 432. From REPLACE XMLHTTPREQUEST API(S) WITH SAFE XMLHTTPREQUEST API operation 440, processing transitions to a REPLACE OBJECT TAG(S) WITH ACTIVEX REPLACEMENT OBJECT operation 442.

In REPLACE OBJECT TAG(S) WITH ACTIVEX REPLACEMENT OBJECT operation 442, each object tag present in the script, if any, is replaced with the ActiveX replacement object earlier injected and defined in operation 432. In one embodiment, Microsoft.XMLHTTP objects, as well as the Msxml2.XMLHTTP object and any other used XML requesters are replaced with the ActiveX replacement object. From REPLACE OBJECT TAG(S) WITH ACTIVEX REPLACEMENT OBJECT operation 442, processing transitions to a NEXT SCRIPT check operation 448.

In NEXT SCRIPT check operation 448, a determination is made whether a next script identified in operation 434 remains to be evaluated. When a next script remains to be evaluated ("YES"), from NEXT SCRIPT check operation 448 processing returns to operation 438 with a next script selected for evaluation. Alternatively, when a next script does not remain to be evaluated ("NO"), from NEXT SCRIPT check operation 448, processing transitions, at operation 450, to operation 412 (FIG. 4B) with the HTTP response released to web browser 114, and processing exiting method 400 at EXIT operation 404 (FIG. 4A), or optionally returning to operation 204 (FIG. 4A) on proxying of a next inbound HTTP request.

In another embodiment, method 400 can be extended to include operations 304, 306, and 308 (FIG. 3B), e.g., between operations 210/212 and operation 214, such that similar to method 300, a user is prompted to input whether to confirm or deny blocking an HTTP request prior to a selected HTTP request being blocked.

In a still further embodiment, the proxying and evaluation of an HTTP response can be separately implemented. Thus, in another embodiment, operations 402-450 can be separately performed by client anti-pharming application 106 to protect a client computer system from malicious code and/or malicious activity, such as a drive-by pharming attack.

Referring again to FIG. 1, client anti-pharming application 106 is in computer memory 112. As used herein, a computer memory refers to a volatile memory, a non-volatile memory, or a combination of the two. Although client anti-pharming application 106 is referred to as an application, this is illustrative only. Client anti-pharming application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client configuration, an embodiment of the present invention may be carried out using any suitable means and/or hardware configuration involving a personal computer, a workstation, a portable device, or a network of computer devices. Other network configurations other than client configurations, e.g., client-server, peer-to-peer, web-based, intranet, internet network configurations, are used in other embodiments.

Herein, a computer program product comprises a non-transitory tangible medium configured to store computer readable code including CD-ROM discs, DVDs, ROM cards, floppy discs, magnetic tapes, computer hard drives and servers on a network.

As illustrated in FIG. 1, this medium may belong to the computer system itself. However, the medium also may be removed from the computer system. For example, client anti-pharming application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, client computer system 102 and/or server computer system 130 is a portable computer, a workstation, a two-way pager, a cellular telephone, a digital wireless telephone, a personal digital assistant, a server computer, an Internet appliance, or any other device that includes components that can execute the parental control functionality in accordance with at least one of the embodiments as described herein. Similarly, in another embodiment, client computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionalities of client anti-pharming application 106 in accordance with the embodiments of the present invention can be implemented in a wide variety of computer system configurations. In addition, the functionalities of client anti-pharming application 106 could be stored as different modules in memories of different devices. For example, client anti-pharming application 106 could initially be stored in server computer system 130, and then as necessary, a portion of client anti-pharming application 106 could be transferred to client computer system 102 and executed on client computer system 102. Consequently, part of the functionality of client anti-pharming application 106 would be executed on processor 134 of server computer system 130, and another part would be executed on processor 108 of client computer system 102.

In view of this disclosure, those of skill in the art can implement various embodiments of the present invention in a wide-variety of physical hardware configurations using an operating system and computer programming language of interest to the user. In yet another embodiment, client anti-pharming application 106 is stored in memory 136 of server computer system 130. Client anti-pharming application 106 is transferred over network 126 to memory 112 in client computer system 102. In this embodiment, network interface 138 and I/O interface 110 would include analog modems, digital modems, or a network interface card. If modems are used, network 126 includes a communications network, and client anti-pharming application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
executing, by a processor in a client computer system, an anti-pharming application, wherein execution of said anti-pharming application generates said method comprising:
proxying an HTTP request on the client computer system prior to release to a router, said HTTP request including an HTTP header;
determining, following the proxying and prior to release to the router, whether said HTTP header identifies a referrer URL corresponding to routable, public IP address and a target URL corresponding to a non-routable, private IP address,
wherein the determining includes:
resolving said referrer URL to a referrer URL IP address;
resolving the target URL to a target URL IP address; and
comparing the referrer URL IP address and the target URL IP address to a database of known IP addresses to make the determination;
wherein upon a determination that said HTTP header identifies a referrer URL corresponding to a routable, public IP address and a target URL corresponding to a non-routable, private IP address, blocking said HTTP request; and
providing an alert notification.

2. The computer-implemented method of claim 1 further comprising:
prior to said blocking said HTTP request, determining whether to exclude said HTTP request from blocking;
upon a determination to exclude said HTTP request from blocking, releasing said HTTP request; and
upon a determination not to exclude said HTTP request from blocking, allowing said blocking said HTTP request.

3. The computer-implemented method of claim 1 further comprising:
prior to said blocking said HTTP request, prompting a user to input a confirmation or a denial of said blocking said HTTP request;
upon receipt of said denial, releasing said HTTP request; and
upon receipt of said confirmation, allowing said blocking said HTTP request.

4. The computer-implemented method of claim 1 further comprising:
wherein upon a determination that said HTTP header does not identify a referrer URL corresponding to a routable, public IP address and a target URL corresponding to a non-routable, private IP address, releasing said HTTP request, said releasing allowing said HTTP request to be sent as a released HTTP request to said target URL.

5. The computer-implemented method of claim 4 further comprising:
proxying an HTTP response received in response to said released HTTP request;
determining whether said HTTP response identifies a content of content type text/html or of content type script;
wherein upon a determination that said HTTP response does not identify said content of said content type text/html or of said content type script, releasing said HTTP response; and
wherein upon a determination that said HTTP response identifies said content of said content type text/html or of said content type script, modifying said content to prevent malicious activity, and releasing said HTTP response.

6. The computer-implemented method of claim 5 wherein upon a determination that said HTTP response identifies said content of said content type text/html, said modifying said content to prevent malicious activity includes:
parsing said content to identify each HTML-referenced URL present in said content;
determining whether said each HTML-referenced URL corresponds to a non-routable, private IP address; and
wherein when an HTML-referenced URL corresponds to a non-routable, private IP address, replacing said HTML-referenced URL with a safe URL; and
releasing said HTTP request.

7. The computer-implemented method of claim 5 further comprising:
wherein upon a determination that said HTTP response identifies said content of said content type script, said modifying said content to prevent malicious activity includes:
injecting a JavaScript override at the top of said content prior to any scripts, said JavaScript override defining a safe XMLHttpRequest API and an ActiveX replacement object;
parsing said content to identify each script other than said JavaScript override;
replacing each XMLHttpRequest API in said each script, if any, with said safe XMLHttpRequest API; and
replacing each object tag in said each script, if any, with said ActiveX replacement object; and
releasing said HTTP request.

8. A computer-program product comprising a non-transitory tangible computer readable medium containing computer program code comprising:
- a client anti-pharming application for proxying an HTTP request on a client computer system prior to release to a router, said HTTP request including an HTTP header;
- said client anti-pharming application further for determining, following the proxying and prior to release to the router, whether said HTTP header identifies a referrer URL corresponding to routable, public IP address and a target URL corresponding to a non-routable, private IP address,
  - wherein the determining includes:
    - resolving said referrer URL to a referrer URL IP address;
    - resolving the target URL to a target URL IP address; and
    - comparing the referrer URL IP address and the target URL IP address to a database of known IP addresses to make the determination;
- wherein upon a determination that said HTTP header identifies a referrer URL corresponding to a routable, public IP address and a target URL corresponding to a non-routable, private IP address, said client anti-pharming application further for blocking said HTTP request; and
- said client anti-pharming application further for providing an alert notification.

9. The computer-program product of claim 8 further comprising:
- prior to blocking said HTTP request, said client anti-pharming application further for determining whether to exclude said HTTP request from blocking;
- upon a determination to exclude said HTTP request from blocking, said client anti-pharming application further for releasing said HTTP request; and
- upon a determination not to exclude said HTTP request from blocking, said client anti-pharming application further for allowing said blocking said HTTP request.

10. The computer-program product of claim 8 further comprising:
- prior to blocking said HTTP request, said client anti-pharming application further for prompting a user to input a confirmation or a denial of said blocking said HTTP request;
- upon receipt of said denial, said client anti-pharming application further for releasing said HTTP request; and
- upon receipt of said confirmation, said client anti-pharming application further for releasing said HTTP request.

11. The computer-program product of claim 8 further comprising:
- wherein upon a determination that said HTTP header does not identify a referrer URL corresponding to a routable, public IP address and a target URL corresponding to a non-routable, private IP address, said client anti-pharming application further for releasing said HTTP request, said releasing allowing said HTTP request to be sent as a released HTTP request to said target URL.

12. The computer-program product of claim 8 further comprising:
- said client anti-pharming application further for proxying an HTTP response received in response to said released HTTP request;
- said client anti-pharming application further for determining whether said HTTP response identifies a content of content type text/html or of content type script;
- wherein upon a determination that said HTTP response does not identify said content of said content type text/html or of said content type script, said client anti-pharming application further for releasing said HTTP response; and
- wherein upon a determination that said HTTP response identifies said content of said content type text/html or of said content type script, said client anti-pharming application further for modifying said content to prevent malicious activity, and said client anti-pharming application further for releasing said HTTP response.

13. The computer-program product of claim 12 wherein upon a determination that said HTTP response identifies said content of said content type text/html, said client anti-pharming application further for parsing said content to identify each HTML-referenced URL present in said content;
- said client anti-pharming application further for determining whether said each HTML-referenced URL corresponds to a non-routable, private IP address; and
- wherein when an HTML-referenced URL corresponds to a non-routable, private IP address, said client anti-pharming application further for replacing said HTML-referenced URL with a safe URL.

14. The computer-program product of claim 12 further comprising:
- wherein upon a determination that said HTTP response identifies said content of said content type script,
- said client anti-pharming application further for injecting a JavaScript override at the top of said content prior to any scripts, said JavaScript override including a safe XMLHttpRequest API and an ActiveX replacement object;
- said client anti-pharming application further for parsing said content to identify each script other than said JavaScript override;
- said client anti-pharming application further for replacing each XMLHttpRequest API in said each script, if any, with said safe XMLHttpRequest API; and
- said client anti-pharming application further for replacing each object tag in said each script, if any, with said ActiveX replacement object.

15. A computer system comprising:
- a memory having stored therein a client anti-pharming application; and
- a processor coupled to said memory, wherein execution of said client anti-pharming application generates a method comprising:
  - proxying an HTTP request on a client computer system prior to release to a router, said HTTP request including an HTTP header;
  - determining, following the proxying and prior to release to the router, whether said HTTP header identifies a referrer URL corresponding to routable, public IP address and a target URL corresponding to a non-routable, private IP address,
    - wherein the determining includes:
      - resolving said referrer URL to a referrer URL IP address;
      - resolving the target URL to a target URL IP address; and
      - comparing the referrer URL IP address and the target URL IP address to a database of known IP addresses to make the determination;
    - wherein upon a determination that said HTTP header identifies a referrer URL corresponding to a routable, public IP address and a target URL corresponding to a non-routable, private IP address, blocking said HTTP request; and
    - providing an alert notification.

16. The computer system of claim 15 further comprising:
prior to said blocking said HTTP request, prompting a user to input a confirmation or a denial of said blocking said HTTP request;
upon receipt of said denial, releasing said HTTP request; and
upon receipt of said confirmation, allowing said blocking said HTTP request.

17. The computer system of claim 15 further comprising:
wherein upon a determination that said HTTP header does not identify a referrer URL corresponding to a routable, public IP address and a target URL corresponding to a non-routable, private IP address, releasing said HTTP request, said releasing allowing said HTTP request to be sent as a released HTTP request to said target URL.

18. The computer system of claim 17 further comprising:
proxying an HTTP response received in response to said released HTTP request;
determining whether said HTTP response identifies a content of content type text/html or of content type script;
wherein upon a determination that said HTTP response does not identify said content of said content type text/html or of said content type script, releasing said HTTP response; and
wherein upon a determination that said HTTP response identifies said content of said content type text/html or of said content type script, modifying said content to prevent malicious activity, and releasing said HTTP response.

19. The computer system of claim 18 wherein upon a determination that said HTTP response identifies said content of said content type text/html, said modifying said content to prevent malicious activity includes:
parsing said content to identify each HTML-referenced URL present in said content;
determining whether said each HTML-referenced URL corresponds to a non-routable, private IP address; and
wherein when an HTML-referenced URL corresponds to a non-routable, private IP address, replacing said HTML-referenced URL with a safe URL; and
releasing said HTTP request.

20. The computer system of claim 18 further comprising:
wherein upon a determination that said HTTP response identifies said content of said content type script, said modifying said content to prevent malicious activity includes:
injecting a JavaScript override at the top of said content prior to any scripts, said JavaScript override defining a safe XMLHttpRequest API and an ActiveX replacement object;
parsing said content to identify each script other than said JavaScript override;
replacing each XMLHttpRequest API in said each script, if any, with said safe XMLHttpRequest API; and
replacing each object tag in said each script, if any, with said ActiveX replacement object; and
releasing said HTTP request.

* * * * *